MULTIPLE AMPLIFIER CIRCUIT FOR PROXIMITY FUZE

Filed Nov. 17, 1950 2 Sheets-Sheet 1

INVENTOR.
AMBROSE D. BAKER
BY G. D. O'Brien
ATTORNEY

MULTIPLE AMPLIFIER CIRCUIT FOR PROXIMITY FUZE

Filed Nov. 17, 1950 2 Sheets-Sheet 2

INVENTOR.
AMBROSE D. BAKER
BY
G. D. O'Brien
ATTORNEY 3,131,388

MULTIPLE AMPLIFIER CIRCUIT FOR PROXIMITY FUZE

Ambrose D. Baker, Rochester, N.Y., assignor to the United States of America as represented by the Secretary of the Navy Filed Nov. 17, 1950, Ser. No. 196,202
7 Claims. (Cl. 343—7)

The present invention relates in general to multiple amplifiers for proximity fuzes, and more specifically to dual amplifiers wherein both amplifier units must be simultaneously independently electrically activated, in order to cause the fuze to operate.

Proximity fuzes may sometimes be caused to fire prematurely by receiving signals of the proper frequency, either adventitiously or as the result of deliberate jamming attempts by the enemy, and thus made ineffective.

It is therefore an object of the present invention to render the proximity fuze materially less sensitive to such undesired interfering signals.

A more specific object is to prevent interference with the operation of a proximity fuze by signals of any single frequency.

A still more specific object is to provide amplifier circuits in the fuze, so designed that the simultaneous presence of two distinct frequencies, of proper values and phase relation, is necessary in order to cause the fuze to fire, said two frequencies being produced automatically by mere proximity to the target in the normal operation of the fuze.

Other objects and many of the attendant advantages of this invention will be appreciated readily as the same becomes understood by reference to the following detailed description, when considered in connection with the accompanying drawings, wherein.

Figure 1:
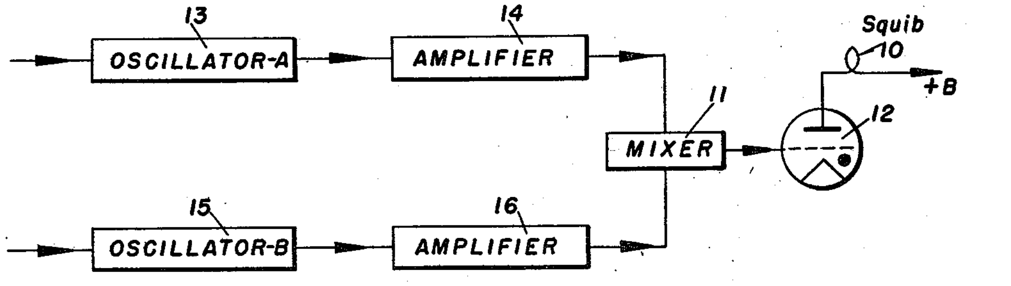
FIG. 1 is a block diagram illustrating certain principles of the invention.

In order to understand the general principles underlying the present invention, it may be desirable first to refer to the block diagram, FIG. 1.

This diagram shows a squib or detonator 10 connected in the anode-power lead of a thyratron 12 which is coupled to the outputs of amplifiers 14 and 16 through a mixer 11. This mixer is so designed that its output will be inadequate to permit thyratron 12 to fire unless certain predetermined output currents are simultaneously present at the outputs of both amplifiers 14 and 16. Each of these currents is determined individually by the respective oscillator 13 or 15 and amplifier 14 or 16 leading to the mixer stage.

These oscillators are adjusted to provide signals of two different beat frequencies with the reflections from the target, so chosen that neither they nor any existing large amplitude harmonics thereof will interfere with one another, to produce a beat within the audio-frequency band that is being utilized in the operation of the fuze.

The circuits are so set up that neither current alone will suffice to fire the squib, but both together will do so, provided they exist simultaneously. This is the important feature of the invention, because it makes it necessary that the amplifier output currents bear proper phase relationship and are both of sufficient amplitude, something that almost certainly will not occur except when both oscillator-amplifier circuits are responding to a target, in which event such amplifier output currents exist automatically, since each circuit acts in the customary manner of a proximity fuze.

Preferably the amplifiers 14 and 16 are single stage pentode regenerative amplifiers, to save space which is very limited within a proximity fuze.

If it is attempted to jam a fuze equipped with such dual circuits by means of a jamming signal of a single correct frequency, the amplifier associated with the corresponding circuit will produce a high output but this alone will not fire the thyratron 12 and thereby ignite the squib and nothing will happen until the missile comes within proper range of the target, at which time the other amplifier will have sufficient output and both jointly through the mixer 11 will activate the fuze to detonate the missile.

If jamming were attempted by sweeping across a scale of frequencies, each circuit would be actuated as its proper frequency was traversed, but obviously it would not be possible in this way to actuate both circuits simultaneously, and the fuze would therefore not succumb to sweep-jamming.

With a normal ripple or beat signal, produced by the intended target, the less sensitive of the two circuits would determine the overall sensitivity, since the more sensitive circuit would merely continue to feed output voltage to the mixer 11 until the less sensitive circuit also received a sufficient signal from the target to produce at least the required minimum output, and thus detonate the missile.

Figure 3:
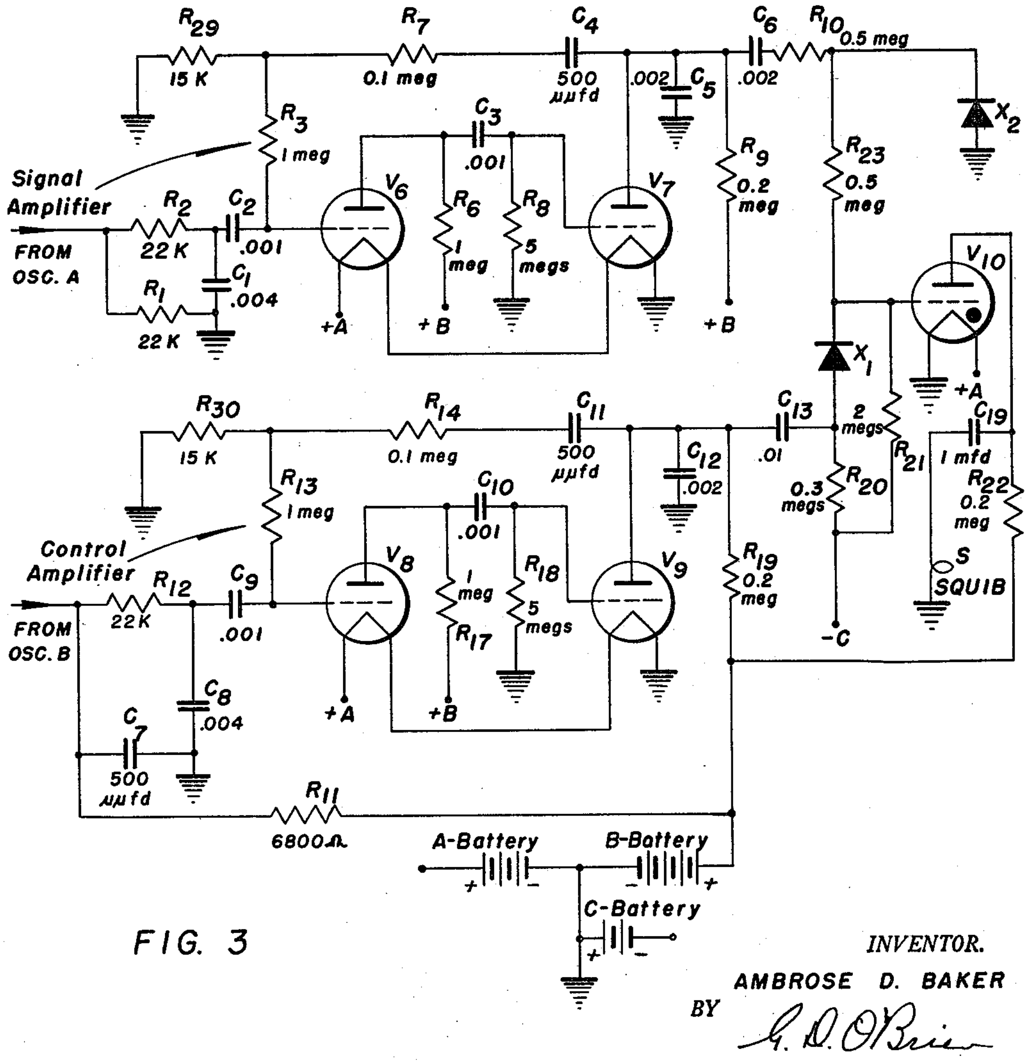
FIG. 3 is a diagram of a modified circuit.
Figure 2:
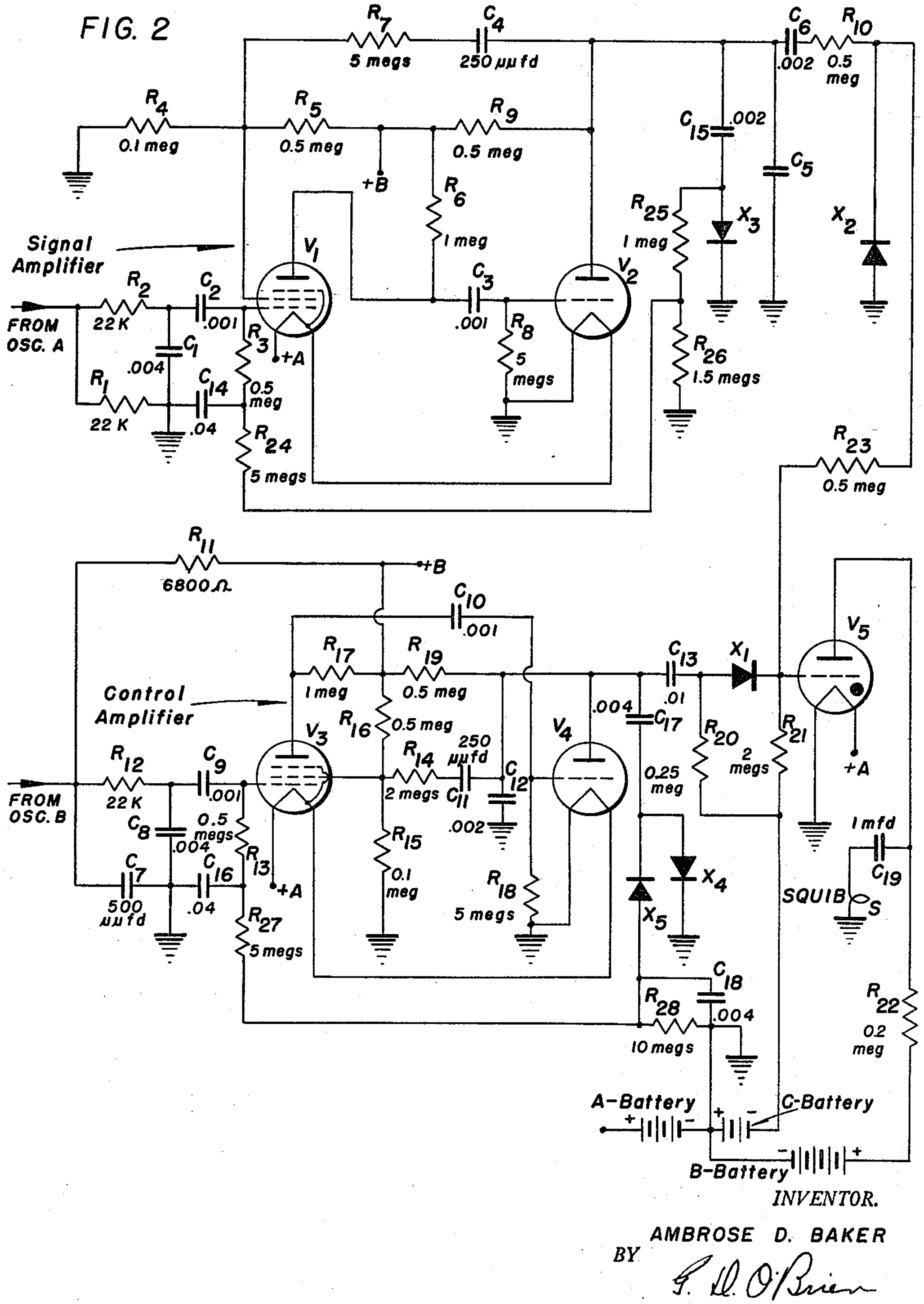
FIG. 2 is a diagram showing a circuit that may be used in practising the invention.

Two complete circuits are shown, as FIGS. 2 and 3 of the drawings. All the circuit constants, that is, the values of resistances and capacitances that were used in one representative case of each type are shown in said views and hence, with a few exceptions, no further mention thereof will be found in the present specification. Moreover, it will be understood that the data given are merely illustrative, and do not limit the invention to any specific values, as wide latitude is possible in most of these circuit constants.

Referring now to FIG. 2, which illustrates details of one practicable embodiment, it will be seen that the diagram discloses two circuits, an upper one and a lower one, and that these two circuits, aside from certain common battery connections, are entirely separate up to their output ends, where both jointly work into the control grid of a single thyratron, $V_5$. Both are amplifier circuits, designed to amplify the audio-frequency beat signals received from oscillators A and B respectively, and the upper one will be referred to as the signal amplifier, while the lower one is designated the control amplifier. Both these circuits are designed to form part of a proximity fuze, and each independently would fire the thyratron of said fuze except that they are intentionally so designed that neither alone has sufficient output voltage, so that both must act together and in phase with each other to actually accomplish such firing of the thyratron. While there is a general similarity between the signal amplifier and the control amplifier, there are also individual important differences, as will become clear from the following detailed descriptions.

The signal amplifier comprises two electronic tubes $V_1$ and $V_2$, the first being shown as a pentode and the second as a triode. Feedback is provided by the circuit that connects the anode of $V_2$ to the screen grid of $V_1$ through the resistor $R_7$, and a suitable stopping capacitor $C_4$. Due to this feedback the response to a given signal input is greatly increased. By returning the feedback circuit to the screen grid instead of to the control grid it also becomes possible to dispense with one capacitor, an important consideration when the space available for accommodating the amplifier is extremely limited, as previously pointed out.

Automatic volume control is provided in the signal amplifier by a single rectifier $X_3$ preferably of the selenium type, for the reason that selenium rectifiers are less sensitive to mechanical shock than others, such as the copper oxide type, for example. The alternating output of $V_2$ is impressed on rectifier $X_3$ through the capacitor $C_{15}$. The voltage divider $R_{25}$, $R_{26}$ then allows a desired portion of this to be returned after rectification, as a D.C. bias to the control grid of $V_1$ thus altering the sensitivity of $V_1$.

The alternating output delivered from the anode of $V_2$ passes through capacitor $C_6$ and resistors $R_{10}$ and $R_{23}$ to the grid of the thyratron $V_5$. A rectifier $X_2$ is shunted to ground between these two resistors and is so connected that negative pulses are by-passed to ground, whereas the positive pulses pass on to the thyratron grid and tend to offset the negative bias normally on said grid.

Passing now to the control amplifier, likewise forming part of FIG. 2, a general similarity to the signal amplifier will be noted. Feedback is provided from the anode of $V_4$ to the screen grid of $V_3$ through capacitor $C_{11}$ and resistor $R_{14}$. Automatic volume control is provided through the rectifiers $X_4$ and $X_5$ which are connected as shown, to increase the negative voltage supplied to the control grid of $V_3$ when a signal is being amplified by the control amplifier, thus limiting the response.

The output of the control amplifier is delivered to the grid of the thyratron $V_5$ through capacitor $C_{13}$ in series with the rectifier $X_1$, which is connected to allow only the positive pulses of the amplified signal to reach the said grid. Thus the outputs of the two amplifiers coact at said grid, and when both are powerful enough and correctly phased they will raise the potential of said grid sufficiently to allow the thyratron to fire.

The capacitor $C_{19}$ is the firing capacitor. It is of sufficient capacitance to fire the squib when it discharges through said squib and through the ionized thyratron $V_5$. The capacitor $C_{19}$ is charged by the B-battery through $R_{22}$, and normally is charged to substantially the full voltage of said battery.

The operation of the two amplifiers just described is as follows: When beat-frequency signals enter the amplifiers from their respective oscillators, amplification occurs in each. The strength of the incoming signal depends on the target distance, and the amplifiers are so adjusted in sensitivity that when the fuze is at the proper distance from the target, these signals will attain amplitudes necessary to energize both amplifiers sufficiently to cause their joint outputs to fire the thyratron $V_5$, whereupon the capacitor $C_{19}$ will discharge through the ionized thyratron and the squib S, thus detonating the latter.

If a jamming signal, of proper frequency to operate either the signal amplifier or the control amplifier, is applied the corresponding amplifier will, of course, become energized. The output however will be insufficient to fire the thyratron, particularly when automatic volume control is present. Hence the squib will not be ignited even though such jamming actuates one of the amplifiers.

In the event of sweep-jamming, which passes successively through a range of frequencies, each amplifier will respond when its proper frequency is reached, but since the two amplifiers are always tuned to different frequencies, obviously they cannot both operate at the same time, hence the squib is still not ignited.

Referring now to the modified circuits shown in FIG. 3, these circuits involve a somewhat simpler device, which does not include the automatic volume control feature. In place thereof, the circuits are designed in such way that they cannot individually cause the thyratron to fire, that is, they have intentionally limited outputs, whereby both must coact in order to supply sufficient positive voltage to the thyratron grid to permit firing.

In this form of the device $V_6$, $V_7$, $V_8$ and $V_9$ are all triodes. Feedback is provided in the signal amplifier by the circuit connecting the anode of $V_7$ to the grid of $V_6$ and including, in series, stopping capacitor $C_4$, resistor $R_7$ and resistor $R_3$, while feedback is provided in the control amplifier by the corresponding circuit through $C_{11}$, $R_{14}$ and $R_{13}$. It may be desirable to point out at this time that resistors, capacitors and rectifiers bearing the same reference numerals are similarly connected and have similar functions in both modifications, although their numerical values may vary, as necessary. For example, $C_4$ and $R_7$ are in the signal amplifier feedback circuit in both FIGS. 2 and 3, while $C_{11}$ and $R_{14}$ correspond thereto in function in the control amplifiers.

The circuits disclosed in FIG. 2 have the advantage of automatic volume control in both the signal amplifier and the control amplifier and also have the desirable advantage of simplicity. However, because of the relatively low voltage developed by the control amplifier, it is necessary to provide the voltage doubler, comprising the two rectifiers $X_4$ and $X_5$, to provide adequate voltage response. As already stated, both the signal amplifier and the control amplifier are regenerative.

The FIG. 3 circuits are likewise regenerative, but lack the automatic volume control feature. The regeneration is obtained in FIG. 3 by feedback from the output of $V_7$ to the control grid of $V_6$, instead of to the screen of a pentode as in FIG. 2, since no pentodes are used in FIG. 3. The sharp peak caused by large feedback may be avoided by suitably broadening the overall response of the amplifier, and the low frequency sensitivity may be increased by increasing the input grid resistors $R_3$ and $R_{13}$ if desired. The requisite high frequency response may be obtained by proper selection of the feedback components $C_4$, $R_7$ and $C_{11}$, $R_{14}$. A decrease in the plate load resistors $R_9$ and $R_{19}$ also helps materially to provide proper frequency response.

Obviously many modifications and variations of the present invention are possible in the light of the above teachings. It is therefore to be understood that within the scope of the appended claims, the invention may be practiced otherwise than as specifically described.

What is claimed is:

1. In a proximity fuze, a dual amplifier device, comprising two regenerative audio frequency electrically operated amplifiers each having a pair of input terminals and a pair of output terminals, each amplifier including an automatic volume control circuit, a thyratron, means connecting one output terminal of each amplifier to the grid of the thyratron and the other output terminal to the thyratron cathode, the automatic volume control circuits of said amplifiers limiting the outputs thereof to amplitudes individually insufficient to cause said thyratron to fire, and individual means connected to the respective pairs of input terminals to supply separate input signals to said amplifiers.

2. In a proximity fuze, a dual amplifier device, comprising two regenerative amplifiers each having a pair of input terminals and a pair of output terminals, each amplifier including automatic volume control means, a thyratron, means connecting one output terminal of each amplifier to the grid of the thyratron and the other output terminal to the thyratron cathode, one of said connections to the thyratron grid having a rectifier in series therewith to prevent negative signals from reaching said grid, the automatic volume control means of each amplifier limiting the amplifier outputs to values individually insufficient to cause said thyratron to fire, and individual means connected to the respective pairs of input terminals to supply separate input signals to said amplifiers.

3. In a proximity fuze, a dual amplifier device, comprising two regenerative amplifiers each having a pair of input terminals and a pair of output terminals, each amplifier including automatic volume control means, one of said means including a voltage doubler, a thyratron, means including two rectifiers and connecting one output terminal of each amplifier to the grid of the thyratron and the other output terminal to the thyratron cathode, one of said rectifiers being connected in series in the connection leading from one of the amplifiers to the thyratron grid and preventing negative signals from reaching said grid, the other rectifier being connected in the connection leading from the other amplifier to the thyratron cathode, and preventing positive signals from reaching said cathode, said automatic volume control means limiting the outputs of the respective amplifiers to amplitudes individually insufficient to cause the thyratron to fire, and individual means connected to the respective pairs of input terminals to supply separate input signals to said amplifiers.

4. In a proximity fuze, a dual amplifier device comprising two two-stage audio frequency amplifiers each including in its first stage a thermionic tube having a screen grid, each amplifier having a pair of input terminals and a pair of output terminals, a feedback circuit in each amplifier connecting the output to said screen grid, a thyratron, means connecting one output terminal of each amplifier to the grid of the thyratron and the other output terminal to the thyratron cathode, each amplifier including output limiting means whereby its output is individually made insufficient to cause the thyratron to fire, and individual means connected to the respective pairs of input terminals to supply separate input signals to said amplifiers.

5. In a proximity fuze, two independent audio frequency electrically operated amplifiers, said amplifiers being individually responsive to audio frequency electromagnetic input signals of two non-overlapping frequency ranges, said amplifiers being connected jointly to actuate the fuze but each including output limiting means rendering it individually incapable of delivering sufficient output to so actuate it.

6. In a proximity fuze as defined in claim 5, the additional feature that the output limiting means of each amplifier is an automatic volume control means.

7. In an electric circuit for a proximity fuze, an electrically detonatable squib, and means for detonating said squib, comprising two amplifiers responsive to audio frequency electromagnetic input signals of non-overlapping frequency ranges, said amplifiers coacting with each other when both signals are present simultaneously, to provide sufficient output to detonate said squib, each amplifier separately having output limiting means causing it to have insufficient output to detonate the squib.

References Cited in the file of this patent

UNITED STATES PATENTS

| | | |
|---|---|---|
| 1,390,768 | Dorsey | Sept. 13, 1921 |
| 2,235,768 | Luck | Mar. 18, 1941 |
| 2,411,787 | Hammond | Nov. 26, 1946 |